United States Patent [19]

Cook et al.

[11] Patent Number: 5,182,379
[45] Date of Patent: Jan. 26, 1993

[54] ACID-CURABLE CELLULOSE ESTERS CONTAINING MELAMINE PENDENT GROUPS

[75] Inventors: Phillip M. Cook; David S. Kashdan, both of Kingsport, Tenn.

[73] Assignee: Eastman Kodak Company, Rochester, N.Y.

[21] Appl. No.: 533,319

[22] Filed: Jun. 5, 1990

[51] Int. Cl.$^5$ .............................................. C08B 3/00
[52] U.S. Cl. ................................. 536/63; 526/238.21; 536/66; 527/301; 528/254; 428/438; 428/464; 428/481; 428/507; 524/35
[58] Field of Search ............... 524/35, 37, 39, 590, 524/597; 526/238.21, 63, 66

[56] References Cited

U.S. PATENT DOCUMENTS

| | | | |
|---|---|---|---|
| 2,918,452 | 12/1959 | Kun et al. | 260/67.6 |
| 2,998,411 | 8/1961 | Housekeeper | 260/67.6 |
| 3,488,350 | 1/1970 | Donaldson | 260/249.6 |
| 4,007,144 | 2/1977 | Sanders et al. | 260/15 |
| 4,133,783 | 1/1979 | Brewer et al. | 260/15 |
| 4,251,404 | 2/1981 | Simms | 260/15 |
| 4,425,466 | 1/1984 | Santer et al. | 524/512 |
| 4,575,536 | 3/1986 | Yamada et al. | 525/162 |
| 4,634,738 | 1/1987 | Santer | 525/162 |
| 4,837,278 | 6/1989 | Cameron et al. | 525/162 |
| 4,839,230 | 6/1989 | Cook | 524/315 |
| 5,082,914 | 1/1992 | Cook et al. | 524/35 |

OTHER PUBLICATIONS

Kirk Othmer *Encyclopedia of Chemical Technology*, vol. 5, 3rd Edition, pp. 120–126 (1979).

*Primary Examiner*—Paul R. Michl
*Assistant Examiner*—Tae H. Yoon
*Attorney, Agent, or Firm*—Betty J. James; William P. Heath, Jr.

[57] ABSTRACT

Modified cellulose esters are described that are prepared by grafting melamine moieties onto the backbone of cellulose esters. The resulting materials are useful in coating applications for wood, leather, and metal substrates and yield highly solvent-resistant coatings with enhanced properties when heated in the presence of an acid catalyst.

26 Claims, No Drawings

ACID-CURABLE CELLULOSE ESTERS CONTAINING MELAMINE PENDENT GROUPS

FIELD OF INVENTION

This invention relates to modified cellulose esters containing pendent alkylated methylolated melamine moieties capable of undergoing crosslinking reactions, optionally in the presence of an acid catalyst, to form coatings with enhanced solvent resistance.

BACKGROUND OF THE INVENTION

Cellulose esters are used extensively in lacquer coatings because they are compatible with many resins and additives, they exhibit good gap-filling properties, they dry quickly and can be sanded or rubbed soon after application, they exhibit low toxicity, and they form a very aesthetically-pleasing coating on a variety of substrates. Such coatings are "forgiving" and are said to be "user friendly" because they can be applied reproducibly and can be repaired or even removed with the use of solvent. Such lack of solvent resistance is an advantage for lacquer handling since equipment used to apply the lacquer can be readily cleaned, but solvent resistance of the applied coating is highly desirable, particularly if the coating is intended to be protective in nature. Moreover, cellulose ester lacquer coatings tend to be rather soft and are easily scratched.

Thus there is a need for a suitably modified cellulose ester still having thermoplastic and aesthetic properties of the original cellulose ester and after application as a coating can be transformed into a three-dimensional polymeric network with significantly improved resistance to solvents and scratching.

The prior art discloses certain compositions containing admixtures of certain cellulose esters and certain melamine compounds (see U.S. Pat. Nos. 4,007,144; 4,133,783 and 4,251,404); however, heretofore substantially non-crosslinked modified cellulose esters as described hereinbelow have been unknown.

SUMMARY OF THE INVENTION

This invention concerns substantially non-crosslinked, modified cellulose esters which comprise cellulose esters, preferably mixed cellulose esters, having melamine groups or moieties grafted thereto. The modified cellulose esters of the invention are self-crosslinking in the presence of an acid catalyst, whether admixed or generated in situ. A preferred modified cellulose ester of this invention comprises a grafted cellulose ester of the formula:

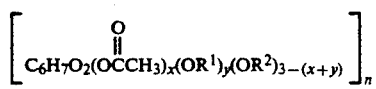

wherein $R^1$ may be monomeric or oligomeric such that the average degree of polymerization is about 1 to about 3, and each $R^1$ is, independently, of the structure:

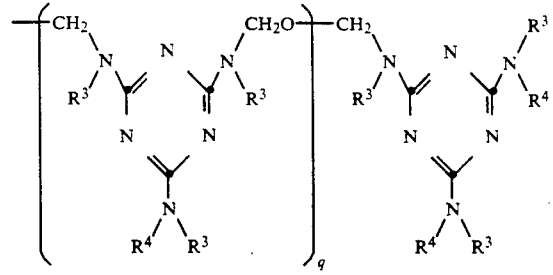

wherein q is 0 or a positive integer, each $R^3$ is, independently, —H, —CH$_2$OH, —CH$_2$OCH$_3$, —CH$_2$OC$_2$H$_5$, —CH$_2$OC$_3$H$_7$, or —CH$_2$OC$_4$H$_9$, each $R^4$, independently, has the same meaning as $R^3$, provided that when $R^3$ is —H, $R^4$ must be other than —H, each $R^2$ is independently —H ,

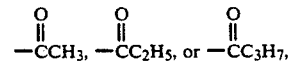

x is 0 to 2.95, y is 0.05 to 0.5, provided that x+y is in the range of 0.05 to 3.0, and n is at least 30.

As used herein, the term "cellulose ester" shall mean an unmodified cellulose ester useful as a starting material for preparing the modified cellulose esters of the invention, and the term "modified cellulose ester" or "grafted cellulose ester" shall mean the modified cellulose ester of the invention which is a cellulose ester having a melamine moiety grafted thereto.

The present invention is also directed to coating compositions containing the modified cellulose ester as well as coated articles prepared therefrom.

The coating compositions of the present invention comprise:

(A) the modified cellulose ester of the invention, (B) about 25 to about 95 weight %, preferably about 50 to about 85 weight % (relative to the weight of the modified cellulose ester), of a solvent, and (C) 0 to about 5 weight %, preferably about 0.1 to about 3 weight % (relative to the weight of the modified cellulose ester), of an acid catalyst.

DETAILED DESCRIPTION OF THE INVENTION

The cellulose esters useful as a starting material for preparing the modified cellulose esters of the present invention are well known in the art. Preferred cellulose esters are C$_1$ to C$_4$ esters of cellulose. The most preferred cellulose esters are mixed esters such as cellulose acetate propionate (CAP) and cellulose acetate butyrate (CAB), and the like. Preferred cellulose esters have a degree of substitution (DS), before grafting the melamine moiety, of about 1.0 to about 2.9, more preferably about 2.0 to about 2.9, most preferably about 2.0 to about 2.8. Cellulose esters useful herein are commercially available from Eastman Chemical Products, Inc., Kingsport, Tenn., U.S.A. or can be made by techniques known in the art, for example, as taught in Kirk-Othmer, *Encyclopedia of Chemical Technology*, 3rd Edition, Vol. 5, Wiley-Interscience, New York (1979), pp.

120-126. Preferred CAP esters have about 1 to about 4 weight % acetyl, about 39 to about 46 weight % propionyl, and about 1 to about 5 weight % hydroxyl. Preferred CAB esters have about 2 to about 15 weight % acetyl, about 35 to about 55 weight % butyryl, and about 1 to about 5 weight % hydroxyl. Examples of cellulose esters which are commercially available from Eastman Chemical Products, Inc. include, but are not limited to, the following: CAB-553, CAB-551, CAB-381, CAP-504, CAP-482, CA-320S, and CA-398.

Cellulose ester starting materials typically have a number average molecular weight of between about 10,000 and about 75,000.

The modified cellulose esters can be prepared by reacting a cellulose ester with a melamine compound. Melamine itself does not readily react with hydroxyl-containing materials such as cellulose or a cellulose ester with residual unreacted hydroxyl groups. To improve its reactivity, melamine is often reacted with formaldehyde to yield a poly-methylolated melamine containing up to six methylol groups per melamine nucleus. However, these materials tend to be unstable and incompatible with a variety of resins and are thus usually not preferred. To improve the compatibility and stability of these materials, the methylolated melamine is reacted with an alcohol such as a $C_1$–$C_4$ alcohol, e.g., methanol or butanol, under acidic conditions to yield methylol ethers of melamine. These react readily with hydroxyl, carboxyl, or amide functionalities.

Preferred melamine compounds are aminoplast resins which are prepared by reacting melamine with formaldehyde and then with a low molecular weight alcohol as described above. Disclosure and preparation of suitable melamine compounds can be found in U.S. Pat. Nos. 2,918,452 and 2,998,411, incorporated herein by reference in their entirety. Suitable aminoplast resins are commercially available from Monsanto, St. Louis, Miss., U.S.A. (RESIMENE series) and from American Cyanamid, Wayne, N.J., U.S.A. (CYMEL series).

These aminoplast resins contain monomeric and oligomeric triazine nuclei connected together by methylol ether bridges with an average degree of polymerization of from 1 to about 3 and are represented by the following formula:

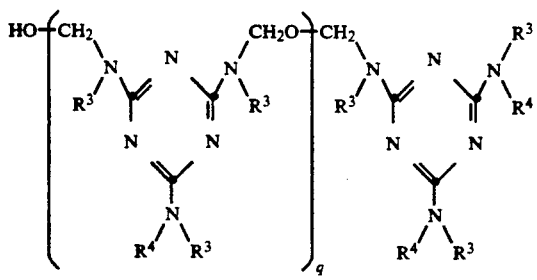

wherein q is 0 or a positive integer.

It is preferred that q, in both the starting compound and in the pendent moiety, is 0, 1 or 2.

Although the above formula for the aminoplast resin depicts a linear structure, it is contemplated that equivalent branched structures can be present.

The modified cellulose esters of the invention can be prepared by reacting a melamine compound with a cellulose ester under conditions to form a grafted cellulose ester having melamine moieties grafted to the backbone of the anhydroglucose rings of the cellulose ester.

Melamine compounds contemplated herein react with residual hydroxyl or carboxyl groups under acidic conditions. Thus reacting a cellulose ester having residual hydroxyl groups with one or more of these resins optionally in the presence of an acid catalyst yields a modified cellulose ester with pendent melamine moieties useful for later internal crosslinking reactions.

It is important that the melamine moieties be grafted directly to the cellulose ester backbone since admixture of an equivalent amount of melamine compound with the cellulose ester can result in undesirable softening or plasticization of the coating. This interferes with rubbing or sanding the coating before cure. Subsequent crosslinking reactions of modified cellulose esters are also more efficient than those in which the cellulose ester and melamine compound are simply admixed since these melamine compounds can homo-polymerize and not lead to productive crosslinking bond formation between cellulose ester chains. This will decrease the solvent resistance properties of the coating since the cellulose ester will not be completely bonded into the polymeric network.

It is anticipated that the modified cellulose esters are useful in coating formulations for leather, metal, and wood coatings as a crosslinking agent or adhesion promoter since the melamine moieties can react with residual hydroxyl or carboxyl groups of the substrate to improve adhesion between the coating and substrate and between grafted and other ungrafted cellulose esters or resins in the coating formulation.

Preferred modified cellulose esters of this invention are prepared by reacting the aminoplast resin in an organic solvent, preferably in the presence of an acid catalyst. By necessity the cellulose ester must contain residual groups capable of reacting with the aminoplast resin. Such reactive groups would usually include hydroxyl, carboxyl, and to a lesser extent, amides.

Preferred modified cellulose esters of the invention have the formula:

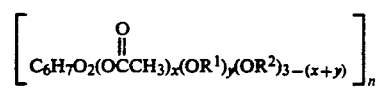

wherein
$R^1$ may be monomeric or oligomeric such that the average degree of polymerization is about 1 to about 3, and each $R^1$ is, independently, of the structure

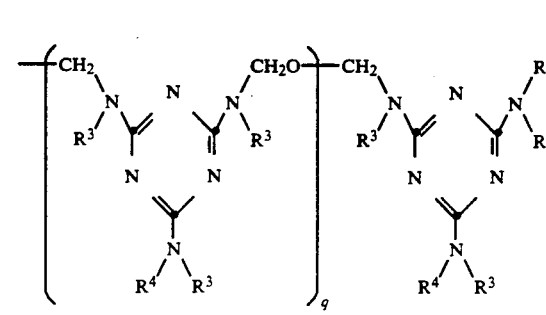

wherein q is 0 or a positive integer, each $R^3$ is, independently, —H, —CH$_2$OH, —CH$_2$OCH$_3$, —CH$_2$OC$_2$H$_5$, —CH$_2$OC$_3$H$_7$, or —CH$_2$OC$_4$H$_9$, each $R^4$, independently, has the same meaning as $R^3$, provided that when $R^3$ is —H, $R^4$ must be other than —H, each $R^2$ is, independently, —H,

x is 0 to 2.95, y is 0.05 to 0.5, provided that x+y is in the range of 0.05 to 3.0, and n is at least 30.

It is more preferred that x is 0.1 to 0.4, y is 0.1 to 0.3, and n is 30 to 250.

For preparing the modified cellulose ester of the present invention, the degree of reaction between the melamine compound and the residual hydroxyls of the cellulose ester must be such that about 25–100% of the hydroxyls react. The percentage by weight of the melamine moiety incorporated into the cellulose ester is about 10 to about 50% based on the weight of the starting cellulose ester.

The molar proportions of starting materials used in the process for producing the modified cellulose esters of the present invention are those proportions sufficient to result in the desired degree of substitution of the cellulose ester to achieve the desired product.

Suitable solvents for the grafting reaction include esters, alcohols, and chlorinated hydrocarbons. The organic solvent must necessarily solubilize the cellulose ester and melamine compound and not contain multifunctional groups capable of undergoing crosslinking reactions with the aminoplast resin. Preferred solvents include: organic esters such as ethyl acetate, propyl acetate, butyl acetate; alcohols such as ethanol, butanol, 2-ethoxyethanol; chlorinated hydrocarbons such as methylene chloride, chloroform, and chlorobenzene; and mixtures of these. Use of ketonic solvents such as acetone, 2-butanone, and 2-pentanone results in very little or no grafting since the resulting cellulose ester fails to undergo crosslinking reactions.

The temperature range for carrying out the grafting reaction in a solvent is about 35°–150° C. with the preferred range being about 70°–120° C. The useful temperature range for product formation depends on the catalyst level, catalyst type, the hydroxyl content of the cellulose ester, the type of melamine compound, and solubility of the cellulose ester in the solvent. The reaction is preferably, but not necessarily, carried out at reflux. Reactions are typically carried out in 10–35% solutions based on the weight of the cellulose ester.

The acidic catalysts used for the grafting reaction can be, but are not limited to, organic acids such as acetic, propionic, butyric, succinic, and phthalic; and organic anhydrides such as acetic, propionic, butyric, succinic, and phthalic. Inorganic acids such as phosphoric, sulfuric, and hydrochloric can be used but are not preferred because of their deleterious effect on the cellulose ester backbone. Sulfonic acids such as toluenesulfonic and methanesulfonic acids can be used but tend to increase the rate of the grafting reaction so that it may become uncontrollable and the reaction mixture can gel. The acid catalyst may be admixed with the reaction mixture or may be generated in situ, for example, by slight decomposition of the cellulose ester to form acetic, butyric, and/or propionic acids.

The amount of acid catalyst used in the grafting reaction depends on the strength of the acid catalyst, but, of course, is always a catalytic amount. If a strong acid catalyst is used, very little catalyst needs to be present (trace–0.1%) based on the weight of the cellulose ester present. Weak acid catalysts such as acetic, phthalic, or butyric acids typically require 0.1–5% based on the weight of the cellulose ester. The amount and strength of the catalyst used must be balanced to achieve a desirable and controllable rate of reaction for the grafting process, since the rate increases with increasing catalyst strength and concentration.

After the reaction between the melamine compound(s) and the cellulose ester has occurred, the modified cellulose ester can be isolated from the reaction mixture by addition of a nonsolvent, such as heptane, hexane, cyclohexane, or ligroin, that does not promote dissolution of the modified cellulose ester. Alternatively, the reaction mixture can be added to the nonsolvent to precipitate the grafted cellulose ester. Excess melamine compound that has not reacted with the cellulose ester can be removed by washing the precipitated grafted cellulose ester with water or water/alcohol mixtures, depending on the water-solubility of the melamine compound. Alternatively, if a water-immiscible reaction solvent is used, water may be added to the reaction mixture directly to extract out the water-soluble melamine compound. The organic layer containing the modified cellulose ester can then be treated as above with a nonsolvent to precipitate the grafted cellulose ester.

Product drying conditions are critical since heating the product can lead to initiation of crosslinking reactions, particularly if any acidic impurities are present. Thus, these modified cellulose esters should be dried at the lowest practical temperature. This temperature will depend on the amount and strength of any residual acidic impurities, the degree of grafting on the cellulose ester, and the type of melamine compound. Vacuum or forced-air drying with a large air flow are preferred. The preferred drying temperature range is 25° to 60° C. The modified cellulose ester of the present invention useful for coatings applications is substantially non-crosslinked (i.e., non-cured). By the term "substantially non-crosslinked" is meant that there is no crosslinking or such a small amount that the modified cellulose ester is still solvent soluble (and is thus pourable or flowable) and is able to undergo subsequent crosslinking in coatings applications.

In the coating composition of the present invention the suitable solvent must be one in which the grafted cellulose ester is soluble, therefore water and most aliphatic hydrocarbons are not suitable for this purpose. Usually the same solvents suitable for the grafting reaction are also suitable for use in the coating composition. Typical examples of such solvents include, but are not limited to, esters, alcohols, aromatic hydrocarbons, and chlorinated hydrocarbons. Specific examples include, but are not limited to ethyl acetate, propyl acetate, butyl acetate, ethanol, n-butanol, 2-ethoxyethanol, methylene chloride, chloroform, and chlorobenzene.

The amount of suitable solvent in the coating composition of the present invention is that amount sufficient to solubilize the grafted cellulose ester. Typically, this amount is about 25 to about 95 weight % relative to the weight of the modified cellulose ester, preferably about 50 to about 85 weight %, and more preferably about 65 to about 75 weight %. It is contemplated that mixtures of solvents can be used in the coatings (and processes) of the present invention.

The acid catalysts useful in the coating compositions of the present invention are the same as used in the grafting process for preparing the modified cellulose ester. The acid catalyst (whether added or generated in situ) is present in an amount sufficient to catalyze the degree of curing desired. The amount of acid catalyst added to the coating compositions is typically 0 to about 5 weight %, preferably about 0.1 to about 3 weight %, and more preferably about 0.1 to about 3 weight %, relative to the weight of the modified cellulose ester. Of course, mixtures of acids can be used. The acid catalyst may be admixed in the coating composition or may be generated in situ (or a combination of both). Upon heating the coating composition some acetic acid (and/or propionic acid and/or butyric acid) is generated in situ from the modified cellulose ester; also, other additives which optionally can be present may decompose upon heating and form sufficient acid catalyst in situ.

The coating composition may optionally contain other formulation additives which contribute to the nonvolatile content of the composition. Such additives include, for example, leveling agents, antifoamants, biocides, and the like. Such additives may be present in an amount of from about 0.1 to about 5 weight percent of total coating composition, preferably about 0.1 to about 1.0 weight percent.

To prepare the coated article of the present invention, the modified cellulose ester of the present invention is applied to a substrate and then is cured (i.e., crosslinked) by an amount of heat sufficient to effect the desired degree of curing. The substrate can be wood; plastic; metal such as aluminum or steel; cardboard; glass; cellulose esters such as cellulose acetate butyrate sheeting; various blends containing, for example, polypropylene, polypropylene and glass, polycarbonate, and various polyesters such as polyethylene terephthalate; as well as other solid substrates.

The curing of the coating compositions containing grafted cellulose esters of the present invention can be carried out in the liquid or solid state (i.e., as a dry film). Curing of the coating compositions can be carried out in the presence of an inert atmosphere such as nitrogen or other inert gas; however, it is an advantage of the present invention that use of such an inert atmosphere is not required.

Typical reaction temperatures used to practice thermal curing of the invention are about 50° to 175° C., with 70° to 120° C. being preferred. Typical curing times for thermal curing are about 0.1 to about 8 hours.

The coating on the coated article of the present invention typically has an enhanced solvent resistance. This can be determined by measuring the % acetone insoluble content of a cured coating. Such a cured coating typically has a % acetone insolubles content greater than a control coating using the same cellulose ester except that it is not grafted. It is preferred that said coating has a % acetone insolubles content of at least about 80%. Such coating also typically has a pencil hardness of greater than or equal to H using ASTM Procedure D-3363. The % acetone insoluble content can be determined according to the procedure described in Example 5 hereof.

The following examples are to illustrate the invention but should not be considered as a limitation thereon.

EXAMPLE 1

CAB 553-0.4 Cellulose Ester Reacted with CYMEL 327 Aminoplast Resin

To a two-liter flask equipped with a stirrer, condenser and thermometer were added one liter of propyl acetate solvent and 200 grams of cellulose acetate butyrate (CAB 553-0.4) (acetyl=3.0%, butyryl=47.3%, hydroxyl=4.5%), commercially available from Eastman Chemical Products, Inc. The contents of the flask were agitated and heated to about 50° C. to dissolve the cellulose ester. After addition of 5 mL of acetic acid catalyst to the batch, 200 grams of CYMEL 327 aminoplast resin (degree of polymerization of 1.8) dissolved in 100 grams of propyl acetate was added. Then the batch was refluxed for 2-3 hours and then cooled to about 40° C. The product was precipitated by drowning the reaction mixture into about one liter of heptane using high speed agitation (blender). The batch was filtered, slurried in water to remove excess aminoplast resin, filtered, and then washed with heptane. The precipitated cellulose ester was then dried at 25°-35° C. in a vacuum oven. The yield of white powder was about 370 grams. The nitrogen content was found to be 10.1% which corresponded to 0.36 DS/AGU (degree of substitution per anhydroglucose unit).

EXAMPLE 2

CAB 553 Cellulose Ester Grafted with CYMEL 303 Aminoplast Resin

Substantially the same procedure above in Example 1 was used to graft CYMEL 303 aminoplast resin (degree of polymerization of 1.7) onto CAB 553-0.4 cellulose ester. The nitrogen content was 6.04% and corresponded with 0.2 DS/AGU.

EXAMPLE 3

CAB 381-0.1 Cellulose Ester Grafted with CYMEL 327 Aminoplast Resin

Using the equipment described above, one liter of propyl acetate and 200 grams of CAB 381-0.1 cellulose ester (acetyl=15%, butyryl=40%, hydroxyl=1.5%) were agitated and heated to about 50° C. until complete dissolution occurred. Next, 87 grams of CYMEL 327 aminoplast resin dissolved in 50 grams of propyl acetate solvent was added, followed by 5 mL of acetic acid. The batch was refluxed for 2-3 hours and then cooled to about 40° C. The product was precipitated by adding about one liter of heptane to the batch over a 1.2 hour period while allowing the temperature of the batch to drift down to about 25°-35° C. The precipitated product was filtered, washed with water, then washed with heptane, and finally dried in a forced air oven at 35°-40° C. The yield of white powder was about 260 grams. The nitrogen content was 2.22% and corresponded to 0.08 DS/AGU.

EXAMPLE 4

CAB 553-0.4 Cellulose Ester Grafted with RESIMENE 717 Aminoplast Resin

To a two-liter flask equipped with a stirrer, condenser and thermometer were added one liter of propyl acetate solvent and 200 grams of CAB 553-0.4 cellulose ester (acetyl=3.0%, butyryl=47.3%, hydroxyl=4.5%). The contents of the flask were agitated and heated to about 50° C. to dissolve the cellulose ester, after which 200 grams of RESIMENE 717 aminoplast resin (degree of polymerization of 1.6) dissolved in 100 grams of propyl acetate and 5 mL of acetic acid were added. The batch was brought to reflux and held for 2-3 hours and then cooled to about 40° C. The product was precipitated by drowning the reaction mixture into about one liter of heptane using high speed agitation (blender). The batch was filtered, washed with water, then with heptane, and dried at 25°-35° C. in a vacuum oven. The yield of white powder was about 340 grams. The nitrogen content was determined to be 10.54% which corresponds to 0.38 DS/AGU.

EXAMPLE 5

CAP 504-0.2 Cellulose Ester Grafted with RESIMENE 740 Aminoplast Resin

Substantially the same procedure as above in Example 4 was used to graft RESIMENE 740 aminoplast resin onto CAP 504-0.2 cellulose ester (acetyl=1%, propionyl=39%, hydroxyl=5%). The nitrogen content of the grafted cellulose ester was 5.88% which corresponded to 0.2 DS/AGU.

Formulations of the grafted cellulose ester were made that contained 20 parts dry grafted cellulose ester, 80 parts of 2-butanone, and 0.2 parts paratoluenesulfonic acid (PTSA). Using a doctor blade, 10-mil wet films were cast onto clean glass plates. The films were dried at 20°-25° C. for 18 hours but were dry to the touch after about 5 minutes. The dry film thickness was 1-1.5 mil. Films of each formulation were subjected to a range of curing times and temperatures using a high-volume forced air oven to minimize the time for temperature equilibration. The degree of cure was determined using acetone insolubility which was measured by removing a portion of the film, weighing it, and placing it in contact with acetone for 18 hours at 25° C. Then the film was removed, dried at ambient conditions, and reweighed. The insoluble gel content was calculated from the weights before and after exposure to acetone.

The following table provides the cure response for the examples prepared above:

| Example No. and Description | Cure Temperature (°C.) | Cure Time (Min.) | % Acetone Insolubles |
| --- | --- | --- | --- |
| 1 | 60 | 180 | 7 |
| CAB 553-0.4 | 90 | 15 | 10 |
| Cellulose Ester- | 90 | 20 | 61 |
| g-CYMEL 327 | 105 | 15 | 85 |
| Aminoplast Resin | 120 | 10 | 91 |
|  | 150 | 5 | 94 |
| 2 | 75 | 40 | 86 |
| CAB 553-0.4 | 90 | 20 | 91 |
| Cellulose Ester- | 115 | 10 | 95 |
| g-CYMEL 303 | 115 | 5 | 93 |
| Aminoplast Resin | 150 | 5 | 97 |
| 3 | 90 | 30 | 46 |
| CAB 381-0.1 | 105 | 30 | 58 |
| Cellulose Ester- | 120 | 10 | 80 |
| g-CYMEL 327 | 150 | 5 | 86 |
| Aminoplast Resin |  |  |  |
| 4 | 60 | 180 | 15 |
| CAB 553-0.5 | 90 | 15 | 10 |
| Cellulose Ester- | 90 | 20 | 58 |
| g-RESIMENE 717 | 105 | 15 | 88 |
| Aminoplast Resin | 120 | 10 | 89 |
|  | 150 | 5 | 91 |
| 5 | 75 | 40 | 48 |
| CAP 504-0.2 | 90 | 20 | 86 |
| Cellulose Ester- | 115 | 10 | 94 |
| g-RESIMENE 740 | 115 | 5 | 89 |
| Aminoplast Resin | 150 | 5 | 95 |

Acid catalyzed crosslinkable cellulose esters have been prepared by grafting aminoplast resins onto the backbone of cellulose esters. These materials are readily crosslinkable when heated in the presence of an acid catalyst like para-toluenesulfonic or acetic acid and form coatings that have very good solvent resistance and hardness characteristics.

The invention has been described in detail with particular reference to preferred embodiments thereof, but it will be understood that variations and modifications can be effected within the spirit and scope of the invention.

We claim:

1. A substantially non-crosslinked modified cellulose ester comprising a cellulose ester having a melamine moiety grafted thereto.

2. The modified cellulose ester of claim 1 wherein said cellulose ester is a $C_1$ to $C_4$ ester of cellulose having at least 30 anhydroglucose units and the percentage by weight of the melamine moiety incorporated into the cellulose ester is about 10 to about 50% based on the weight of the starting cellulose ester.

3. The modified cellulose ester of claim 2 wherein the percentage by weight of the melamine moiety incorporated into the cellulose ester is about 10 to about 50% based on the weight of the starting cellulose ester and said melamine moiety may be monomeric or oligomeric such that the average degree of polymerization is about 1 to about 3, and each melamine moiety is, independently, of the structure:

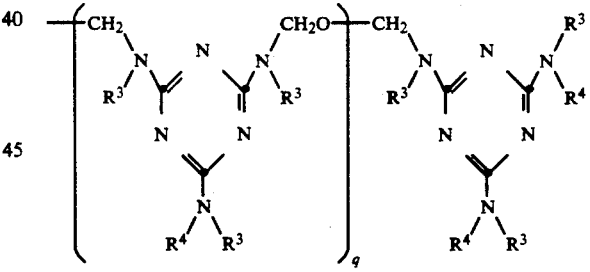

wherein q is 0 or a positive integer, each $R^3$ is, independently, —H, —CH$_2$OH, —CH$_2$OCH$_3$, —CH$_2$OC$_2$H$_5$, —CH$_2$OC$_3$H$_7$, or —CH$_2$OC$_4$H$_9$, and each $R^4$, independently, has the same meaning as $R^3$, provided that when $R^3$ is —H, $R^4$ must be other than —H.

4. A grafted cellulose ester of the formula:

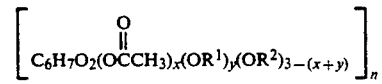

wherein $R^1$ may be monomeric or oligomeric such that the average degree of polymerization is about 1 to about 3, and each $R^1$ is, independently, of the structure:

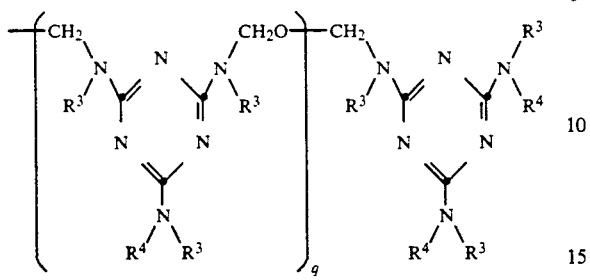

wherein q is 0 or a positive integer, each $R^3$ is, independently, —H, —CH$_2$OH, —CH$_2$OCH$_3$, —CH$_2$OC$_2$H$_5$, —CH$_2$OC$_3$H$_7$, or —CH$_2$OC$_4$H$_9$, each $R^4$, independently, has the same meaning as $R^3$, provided that when $R^3$ is —H, $R^4$ must be other than —H, each $R^2$ is independently, —H,

x is 0 to 2.95, y is 0.05 to 0.5, provided that x+y is in the range of 0.05 to 3.0, and n is at least 30.

5. The modified cellulose ester of claim 4 wherein n is 30 to 250.

6. The modified cellulose ester of claim 4 wherein x is 0.1 to 0.4 and y is 0.1 to 0.3.

7. A coating composition comprising (A) a substantially modified cellulose ester comprising a non-crosslinked cellulose ester having a melamine moiety grafted thereto, (B) about 25 to about 95 weight %, relative to component (A), of a solvent, and (C) 0 to about 5 weight %, relative to component (A), of an acid catalyst.

8. The coating composition of claim 7 wherein the amount of component (B) is about 50 to about 80 weight % and the amount of component (C) is about 0.1 to about 3 weight %.

9. The coating composition of claim 7 wherein the percentage by weight of the melamine moiety incorporated into the cellulose ester is about 10 to about 50% based on the weight of the starting cellulose ester and said melamine moiety may be monomeric or oligomeric such that the average degree of polymerization is about 1 to about 3, and each melamine moiety is, independently, of the structure:

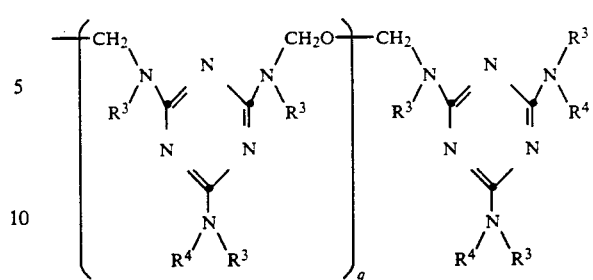

wherein
q is 0 or a positive integer,
each $R^3$ is, independently, —H, —CH$_2$OH, —CH$_2$OCH$_3$, —CH$_2$OC$_2$H$_5$, —CH$_2$OC$_3$H$_7$, or —CH$_2$OC$_4$H$_9$, and
each $R^4$, independently, has the same meaning as $R^3$, provided that when $R^3$ is —H, $R^4$ must be other than —H.

10. The coating composition of claim 7 wherein said modified cellulose ester is of the formula:

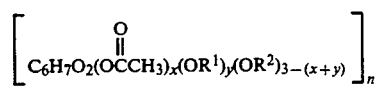

wherein
$R^1$ may be monomeric or oligomeric such that the average degree of polymerization is about 1 to about 3, and each $R^1$ is, independently, of the structure:

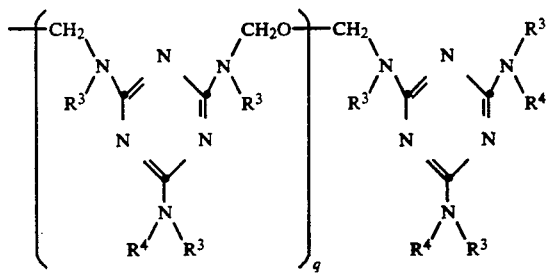

wherein q is 0 or a positive integer,
each $R^3$ is, independently —H, —CH$_2$OH, —CH$_2$OCH$_3$, —CH$_2$OC$_2$H$_5$, —CH$_2$OC$_3$H$_7$, or —CH$_2$OC$_4$H$_9$,
each $R^4$, independently, has the same meaning as $R^3$, provided that when $R^3$ is —H, $R^4$ must be other than —H,
each $R^2$ is, independently, —H,

x is 0 to 2.95,
y is 0.05 to 0.5, provided that x+y is in the range of 0.05 to 3.0, and
n is at least 30.

11. The coating composition of claim 10 wherein n is 30 to 250, x is 0.1 to 0.4, and y is 0.1 to 0.3.

12. The coating composition of claim 10 wherein component (b) is ethyl acetate, propyl acetate, butyl acetate, ethanol, n-butanol, 2-ethoxyethanol, methylene chloride, chloroform, chlorobenzene, or a mixture thereof.

13. The coating composition of claim 10 wherein component (c) is one or a mixture of the following: acetic acid, propionic acid, butyric acid, succinic acid, phthalic acid, acetic anhydride, propionic anhydride, butyric anhydride, succinic anhydride, phthalic anhydride, phosphoric acid, sulfuric acid, hydrochloric acid, toluenesulfonic acid, or methanesulfonic acid.

14. The composition of claim 10 wherein for component (a), the percent by weight of the $R^1$ moiety incorporated into the cellulose ester is about 10–50%, based on the weight of the grafted cellulose ester.

15. The composition of claim 7 containing about 0.1 to about 5 weight % of at least one additional additive selected from a biocide, a leveling agent and an antifoamant.

16. The composition of claim 10 containing about 0.1 to about 5 weight % of at least one additional additive selected from a biocide, a leveling agent and an antifoamant.

17. An article comprising
(A) a substrate, and
(B) a cured coating composition comprising a substantially crosslinked modified cellulose ester comprising a cellulose ester having a melamine moiety grafted thereto.

18. The article of claim 17 wherein component (B) is a modified cellulose ester of the formula:

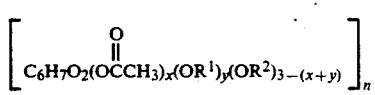

wherein
$R^1$ may be monomeric or oligomeric such that the average degree of polymerization is about 1 to about 3, and each $R^1$ is, independently, of the structure:

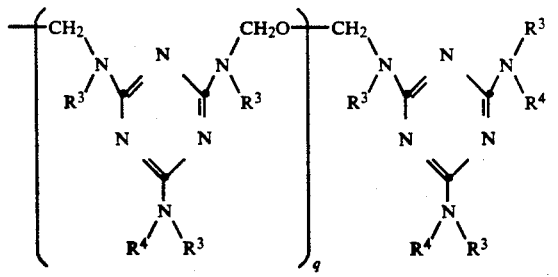

wherein q is 0 or a positive integer,
each $R^3$ is, independently, —H, —CH$_2$OH, —CH$_2$OCH$_3$, —CH$_2$OC$_2$H$_5$, —CH$_2$OC$_3$H$_7$, or —CH$_2$OC$_4$H$_9$,
each $R^4$, independently, has the same meaning as $R^3$, provided that when $R^3$ is —H, $R^4$ must be other than —H,
each $R^2$ is, independently, —H,

x is 0 to 2.95,
y is 0.05 to 0.5, provided that x+y is in the range of 0.05 to 3.0, and
n is at least 30.

19. The article of claim 18 wherein said substrate is wood, plastic, metal, cardboard, glass, a cellulose ester, polypropylene, a polypropylene/glass combination, polycarbonate, or a polyester.

20. The article of claim 18 wherein said coating has a % acetone insolubles greater than a control coating using an ungrafted cellulose ester and a pencil hardness of greater than or equal to H using ASTM Procedure D-3363.

21. A process for preparing a modified cellulose ester of the formula:

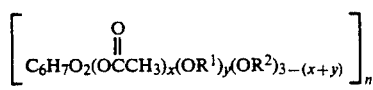

wherein
$R^1$ may be monomeric or oligomeric such that the average degree of polymerization is about 1 to about 3, and each $R^1$ is, independently, of the structure:

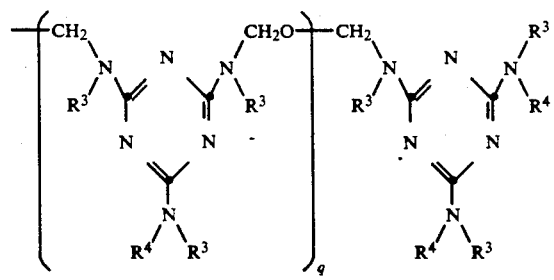

wherein q is 0 or a positive integer,
each $R^3$ is, independently, —H, —CH$_2$OH, —CH$_2$OCH$_3$, —CH$_2$OC$_2$H$_5$, —CH$_2$OC$_3$H$_7$, or —CH$_2$OC$_4$H$_9$,
each $R^4$, independently, has the same meaning as $R^3$, provided that when $R^3$ is —H, $R^4$ must be other than —H,
each $R^2$ is, independently, —H,

x is 0 to 2.95,
y is 0.05 to 0.5, provided that x+y is in the range of 0.05 to 3.0, and
n is at least 30;
comprising contacting
(a) an ester of cellulose and at least one saturated monocarboxylic acid having 2 to 4 carbon atoms, wherein said cellulose ester has a degree of substitution per anhydroglucose unit of residual hydroxyl groups of about 0.1 to 2.0, and
(b) a melamine compound which may be monomeric or oligomeric such that the average degree of polymerization is about 1 to about 3, and is of the formula

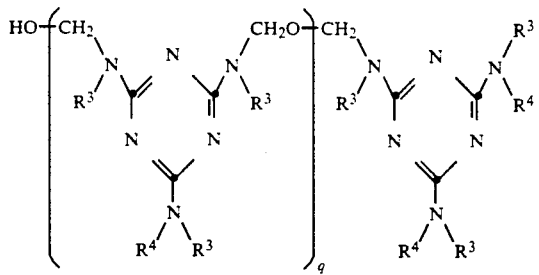

wherein q is 0 or a positive integer in the presence of a solvent and a catalytic amount of an acid catalyst and under conditions such that the desired product is formed.

22. The process of claim 21 carried out at a temperature between about 35° C. to 150° C.

23. The process of claim 21 wherein said modified cellulose ester has a percentage by weight of the melamine moiety incorporated into the cellulose ester of about 10 to about 50% based on the weight of the starting cellulose ester.

24. The process of claim 21 wherein said solvent is ethyl acetate, propyl acetate, butyl acetate, ethanol, n-butanol, 2-ethoxyethanol, methylene chloride, chloroform, chlorobenzene, or a mixture thereof.

25. The process of claim 21 wherein said acid catalyst is one or a mixture of the following acetic acid, propionic acid, butyric acid, succinic acid, phthalic acid, acetic anhydride, propionic anhydride, butyric anhydride, succinic anhydride, phthalic anhydride, phosphoric acid, sulfuric acid, hydrochloric acid, toluenesulfonic acid, or methanesulfonic acid.

26. A process for curing a coating composition comprising:
(A) a substantially non-crosslinked modified cellulose ester comprising a cellulose ester having a melamine moiety grafted thereto,
(B) about 25 to about 95 weight %, relative to component (A), of a solvent, and
(C) 0 to about 5 weight %, relative to component (A), of an acid catalyst, said process comprising subjecting said coating composition to heat under conditions such that the modified cellulose ester of component (A) becomes substantially crosslinked.

* * * * *